Oct. 4, 1949.  R. H. COLE  2,483,401
EXHAUST NOZZLE ACTUATING MECHANISM
Filed June 5, 1947  2 Sheets-Sheet 1
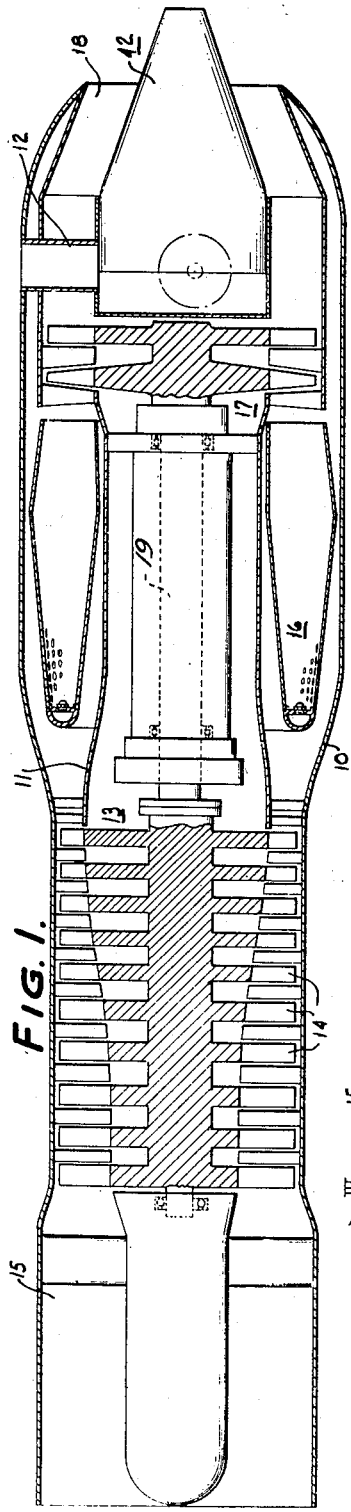
FIG.1.
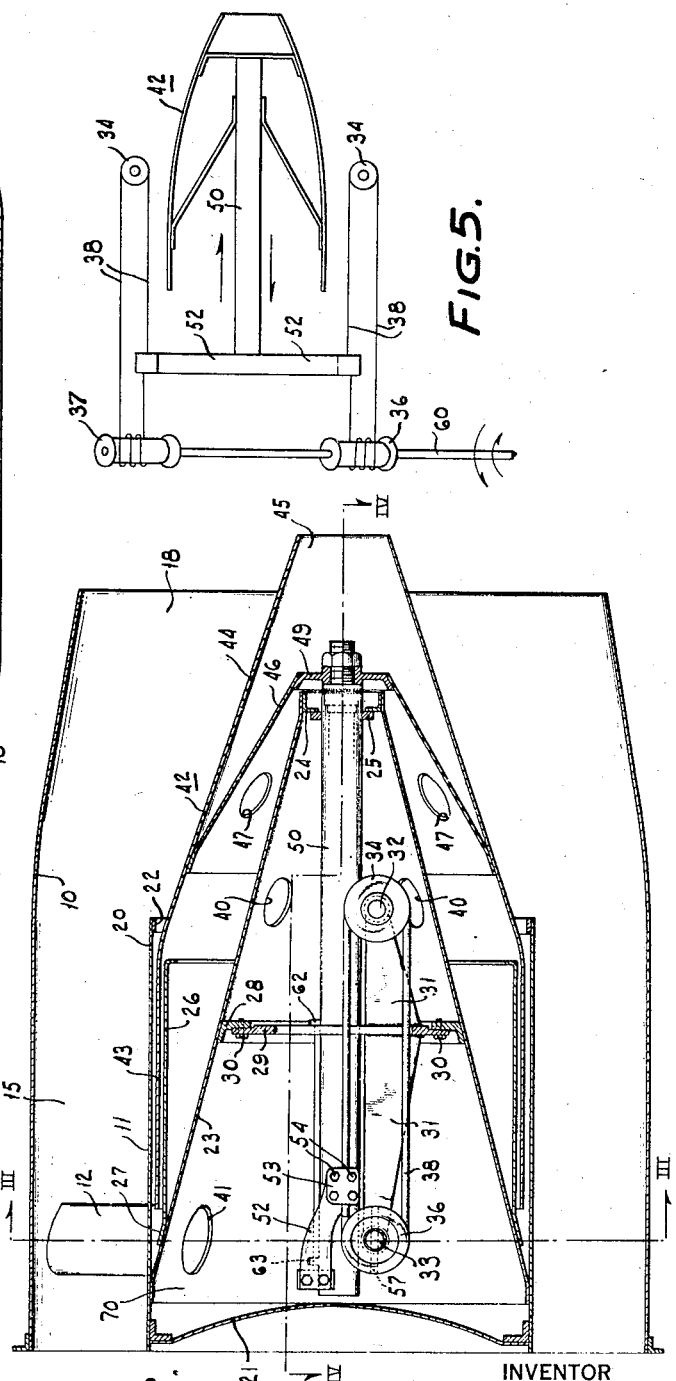
FIG.2.
FIG.5.
INVENTOR
RUSSELL H. COLE
BY
ATTORNEY Oct. 4, 1949. R. H. COLE 2,483,401
EXHAUST NOZZLE ACTUATING MECHANISM
Filed June 5, 1947 2 Sheets-Sheet 2

WITNESSES:
John M. Wright
Vincent W. Novak

INVENTOR
RUSSELL H. COLE
BY
ATTORNEY

Patented Oct. 4, 1949

2,483,401

UNITED STATES PATENT OFFICE 2,483,401

EXHAUST NOZZLE ACTUATING MECHANISM

Russell H. Cole, Pasadena, Calif., assignor to Westinghouse Electric Corporation, East Pittsburgh, Pa., a corporation of Pennsylvania Application June 5, 1947, Serial No. 752,623

1 Claim. (Cl. 60—35.6)

This invention relates to gas turbine power plants, and more particularly to the type in which the exhaust from the turbine is utilized for jet propulsion.

In the operation of a gas turbine power plant of the class having a compressor and a combustion chamber for supplying motive fluid under pressure to a turbine, which drives the compressor, and vents fluid through a discharge or jet nozzle, it may be desirable to control the resultant thrust by regulating the flow characteristics of the jet nozzle. Various means have heretofore been proposed for thus regulating the jet to control the back pressure on the turbine and to vary the velocity of the jet without materially changing the rotative speed of the turbine. It is difficult, however, to devise an adjustable jet regulating mechanism for continuous operation under the extremely high temperature conditions encountered in gas turbine power plants of this type.

It is an object of my invention to provide an improved gas turbine propulsion apparatus including sturdy and durable means for regulating the flow area of the jet nozzle.

Another object of the invention is to provide a gas turbine power plant having an adjustable nozzle construction, and operating means therefor so constructed and arranged as to insure constant ventilation preventing the mechanism from becoming adversely affected by the heat of the turbine exhaust.

These and other objects are effected by the invention as will be apparent from the following description and claim taken in connection with the accompanying drawings, forming a part of this application, in which:

Fig. 1 is a diagrammatic view, mainly in section, of a gas turbine power plant embodying features of the invention;

Fig. 2 is an enlarged detail fragmentary view, mainly in section, of the rear or discharge end of the power plant shown in Fig. 1;

Figure 3:
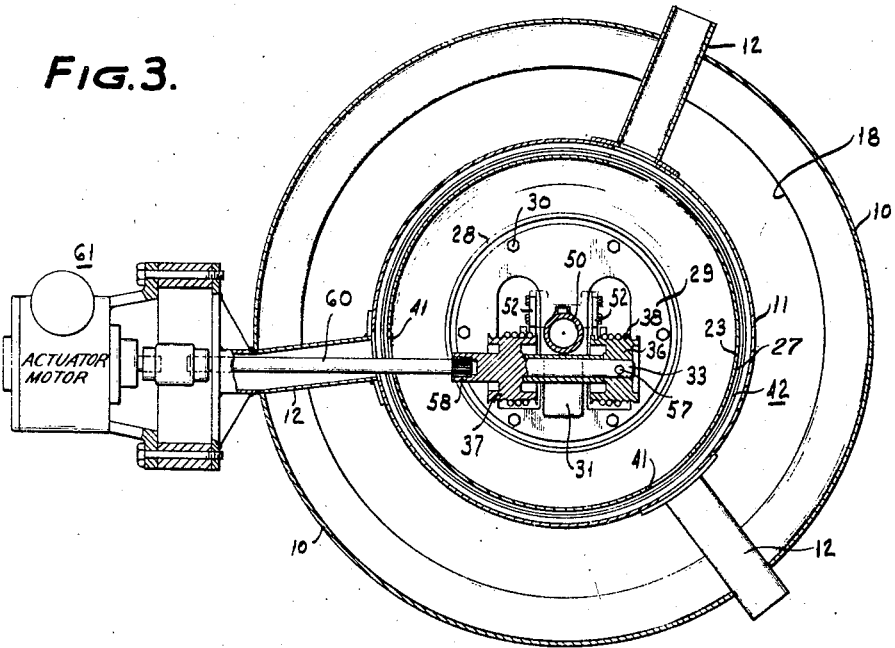
Fig. 3 is a sectional view taken substantially along the line III—III of Fig. 2.

As shown in Fig. 1, a gas turbine power plant with which the features of my invention may be associated, comprises a generally cylindrical outer casing structure 10 and an inner casing or core structure 11 supported coaxially therein by suitable radially disposed struts, such as that indicated at 12. Journaled in the inner casing structure 11 is an axial-flow compressor 13, having a plurality of blades 14 interposed in the annular passage 15, defined between the inner and outer casing structures. The compressor 13 is operative to deliver air under pressure to a suitable combustion apparatus 16, from which heated motive fluid is expanded through a turbine 17 and discharged in the form of a jet through an annular nozzle 18. The turbine 17 is operative to drive the compressor 13 through the medium of a shaft 19. The present invention concerns the provision of selectively operable means for regulating the flow area of the nozzle 18 for governing the thrust provided by the jet.

Figure 4:
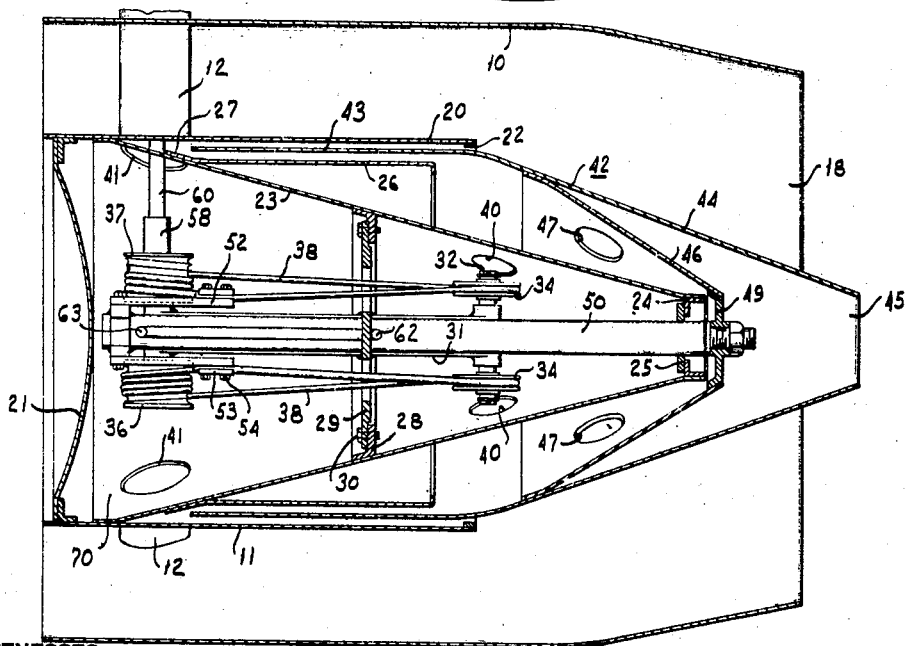
Fig. 4 is a sectional view taken substantially along the lines IV—IV of Fig. 2; and, Fig. 5 is a schematic view of the essential operating elements of an adjustable nozzle device constructed in accordance with the invention.

Referring to Fig. 2 of the drawings, the end of the inner casing structure 11, adjacent the nozzle 18, constitutes a tubular member 20 having an interior baffle or closure wall 21, and a rear opening 22 communicating with the passage 15. According to the invention, there is mounted within the tubular portion 20 a frusto-conical member 23 having its larger end welded or otherwise suitably secured to the inner wall of the portion 20 adjacent the baffle 21. The smaller rear end of the member 23 is disposed in the region of the jet nozzle 18 and has mounted therein an annular flange member 24 supporting an annular bushing 25. A generally cylindrical reinforcing element 26, having a flange 27 welded to the larger end of the frusto-conical member 23, may be provided for strengthening the latter as well as to afford a shielding or insulating effect during operation under high temperature, for minimizing transfer of heat thereto. Intermediate the ends of the frusto-conical member 23 is welded an annular bracket member 28, to which a support structure 29 may be secured by suitable means, such as bolts 30. The support structure 29 includes a longitudinally disposed portion 31, on the rear end of which is mounted a pair of laterally disposed pins 32, and on the forward end of which is journaled a shaft 33. Rotatably mounted on the pins 32 are two pulleys 34, which, as shown in Fig. 4, are disposed on opposite sides of the portion 31.

Disposed at opposite sides of the front of left-hand end of the portion 31, as viewed in Fig. 2, are drums 36 and 37, each of which is preferably provided with a suitably formed spiral groove and is mounted for rotation about the axis of shaft 33. One of a pair of endless cables 38, formed of a suitable material, such as stainless steel, is wound about the groove in each of the drums 36 and 37, and is looped about the corresponding idler pulleys 34. It will thus be understood that upon rotation of the associated shaft 33, as hereinafter explained, the drums 36 will be operated to effect motion of the cables 38.

For a purpose hereinafter described, a number of apertures 40 are formed in the portion of the frusto-conical member 23 rearwardly of the bracket member 28, and similar apertures 41 are formed in the larger end thereof communicating by way of the passages in the hollow struts 12 with atmospheric openings formed in the outer wall of the outer casing structure 10.

The improved gas turbine propulsion apparatus constructed in accordance with my invention further comprises a movable core member or tail-piece cone generally indicated by the reference character 42, which has a tubular front portion 43 adapted to be interposed in non-engaging telescoping relation between the members 20 and 26, and which also has a frusto-conical rear portion 44 having an orifice 45. As shown in Figs. 2 and 4, the frusto-conical portion 44 of the cone 42 is normally disposed within the rear portion of the casing structure 10 to define the nozzle 18 of the gas turbine apparatus. Mounted interiorly of the portion 44 is an inner frusto-conical member 46 having a plurality of apertures 47 and provided with a flange at the larger end thereof, which is welded or otherwise suitably secured to the inner wall of the member 42.

The end of the inner member 46 adjacent the orifice 45 of the cone member 42 is closed by a cap member 49 having a threaded bore for receiving a threaded end of a push rod, which extends longitudinally through and coaxially of the member 23. The outer end of the push rod 50 is slidably mounted in the bushing 25 carried by the smaller end of the member 23. Referring to Fig. 2, it will be seen that the push rod 50 is disposed between the respective pulleys 34, and between the drum members 36 and 37, and somewhat above the axes of rotation of those elements. Mounted on the inner end of the push rod 50 is a bracket member carrying a pair of longitudinally-extending arms 52, each of which is clamped to the adjacent cable 38 by means of a clamping plate 53 and bolts 54. The push rod 50 is thereby operatively connected to the cables 38 so that, upon operation of the cables through the medium of the drum members 36 and 37, the push rod 50 and the attached cone 42 can be shifted along the axis of the casing structures 10 and 11.

This feature of operation will be readily apparent upon reference to Fig. 5 of the drawings, in which the essential elements of the assembly just described are illustrated in schematic form.

Referring to Fig. 3 of the drawings, it will be noted that the shaft 33 with which the respective drums 36 and 37 are adapted to be rotated may, in actual practice, constitute an extension of one of the drum elements, or the left-hand drum element 37 as viewed in this figure, the right-hand drum member 36 being secured to this extension by means of a pin 57. According to this construction, an outwardly-extending axial portion 58 on the opposite side of the drum member 37 carrying the shaft 33 is provided with a suitably formed recess for effecting a spline connection with the inner end of a rotatable shaft 60, the outer end of which extends through one of the hollow struts 12. Mounted on an exterior portion of the outer casing structure 10 is an actuator motor device 61, which may be of any suitable construction designed for pneumatic, hydraulic or electrical operation to drive the shaft 60.

In operation of the apparatus shown in Fig. 1, air entering the forward end of the passage 15 is compressed by the axial-flow compressor 13 and delivered to the combustion apparatus 16, where it is heated and then allowed to expand through the turbine 17, which absorbs a certain portion of the energy from the motive fluid in driving the compressor 13, the residual energy being then expended by discharge of the motive fluid through the nozzle 18 in the form of a jet. According to the invention, the back pressure on the turbine 17 caused by the jet can be selectively controlled by adjustment of the flow area of the nozzle 18 through the medium of the movable cone 42. For example, in starting the power plant, it is desirable that the back pressure on the turbine 17 be reduced by shifting the cone 42 forwardly to increase the flow area of the nozzle 18. When the power plant is subsequently called upon to deliver a maximum thrust, the flow area of the propulsion nozzle 18 may be reduced by shifting the cone 42 rearwardly, or to the right as viewed in Fig. 1.

These adjustments of the movable cone 42 are readily accomplished by operation of the motor 61 to rotate the shaft 60 and associated drum members 36 and 37 for effecting the desired longitudinal movement of the associated cables 38, push rod 50 and cone 42. A projecting lug or pin 62 carried intermediate the ends of the rod 50 is adapted to engage the supporting structure 29 for limiting retraction or forward movement of the cone 42. A similar pin 63 is provided for limiting outward movement of the cone.

By reason of the location of the operating mechanism, including the pulleys 34, drum members 36 and 37, and cables 38, entirely within the interior chamber, designated by the reference character 70, formed in the frusto-conical member 23, which chamber is at all times subjected to a forced draft of cooling air, the otherwise adverse effect of high operating temperature encountered in service is minimized. Ventilation of the chamber 70 containing the operating mechanism for the cone 42 is effected by the supply of atmospheric air through the hollow struts 12 to the chamber 70, from which the cooling air flows outwardly by way of the apertures 40, the apertures 47 and the orifice 45. Maximum freedom of movement of the cone 42 relative to the core structure 11, regardless of heat conditions, is at all times ensured, inasmuch as the sole frictional support for the movable cone is afforded by the bushing 25, which is disposed in a heat-insulated and comparatively cool region of the apparatus.

From the foregoing it will be seen that an improved adjustable tail-piece or nozzle controlling cone structure, embodying features of the invention, may be readily installed in a gas turbine power plant of existing design without the necessity of completely redesigning the apparatus. By reason of the relatively small number of sturdy operating elements required, together with the novel association of these elements in a casing structure so devised as to facilitate constant cooling thereof, the advantages and improved efficiency afforded by the improved apparatus can be realized without excessive expense.

While the invention has been shown in but one form, it will be obvious to those skilled in the art that it is not so limited, but is susceptible of various changes and modifications without departing from the spirit thereof.

What I claim is:

In a gas turbine power plant including a substantially tubular outer casing structure and an inner casing structure supported therein defining an annular flow passage terminating in an annular discharge nozzle through which motive fluid under pressure is expelled for providing a propulsion force, the combination therewith of a movable core member operative to vary the flow area of said nozzle, a casing section secured within the rear end of said inner casing structure defining a ventilated chamber and carrying a terminal bushing, an axially-disposed operating rod constituting the sole support for said core member and slidably extending through said bushing into said chamber, and operating means therefor mounted within said chamber including spaced rotary elements, and a cable movable thereby for operating said rod.

RUSSELL H. COLE.

REFERENCES CITED

The following references are of record in the file of this patent:

UNITED STATES PATENTS

| Number | Name | Date |
| --- | --- | --- |
| 2,123,528 | Goldfield et al. | July 12, 1938 |
| 2,383,385 | Heintze | Aug. 21, 1945 |

OTHER REFERENCES

Aviation, November 1945, pp. 121–123, 130.
Aviation, March 1946, pp. 55–58.